United States Patent
Li et al.

(10) Patent No.: US 10,789,810 B1
(45) Date of Patent: Sep. 29, 2020

(54) DETERMINING ACTION SELECTION POLICIES OF AN EXECUTION DEVICE

(71) Applicant: Alibaba Group Holding Limited, George Town (KY)

(72) Inventors: Hui Li, Hangzhou (CN); Kailiang Hu, Hangzhou (CN); Le Song, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/712,017

(22) Filed: Dec. 12, 2019

Related U.S. Application Data

(63) Continuation of application No. PCT/CN2019/087003, filed on May 15, 2019.

(51) Int. Cl.
    *A63F 3/00*      (2006.01)
    *G07F 17/32*      (2006.01)

(52) U.S. Cl.
    CPC ...... *G07F 17/3262* (2013.01); *G07F 17/3241* (2013.01); *G07F 17/3293* (2013.01)

(58) Field of Classification Search
    CPC .. G06N 7/06; G06N 7/08; G06N 5/00; G06N 3/04; A63F 2011/0093; A63F 2001/001–008; A63F 3/00; G07F 17/32
See application file for complete search history.

(56) References Cited

U.S. PATENT DOCUMENTS

| | | | |
|---|---|---|---|
| 2013/0204412 A1* | 8/2013 | Marecki | G07F 17/32 700/93 |
| 2014/0039913 A1 | 2/2014 | Sandholm | |
| 2017/0257452 A1 | 9/2017 | Hoiles et al. | |
| 2018/0098330 A1 | 4/2018 | Nguyen et al. | |
| 2018/0207583 A1 | 7/2018 | Koyanaka | |
| 2018/0357554 A1 | 12/2018 | Hazan et al. | |
| 2019/0122140 A1* | 4/2019 | Sen | G06N 3/088 |
| 2019/0163515 A1 | 5/2019 | Sekhar Kakaraparthi | |
| 2019/0392309 A1 | 12/2019 | Bhatnagar et al. | |

OTHER PUBLICATIONS

Brown et al., "Deep counterfactual regret minimization," arXiv preprint arXiv:1811.00164, Nov. 13, 2018, pp. 1-12.

(Continued)

*Primary Examiner* — Omkar A Deodhar
(74) *Attorney, Agent, or Firm* — Fish & Richardson P.C.

(57) ABSTRACT

Disclosed herein are methods, systems, and apparatus for generating an action selection policy (ASP) of an execution device. One method includes, in a current iteration, computing a first reward for a current state based on respective first rewards for actions in the current state and an ASP of the current state in the current iteration; computing an accumulative respective regret value of each action in the current state based on a difference between the respective first reward for the action and the first reward for the current state; computing an ASP of the current state in the next iteration; computing a second reward for the current state based on the respective first rewards for the actions and the ASP of the current state in the next iteration; and determining an ASP of the previous state in the next iteration based on the second reward for the current state.

24 Claims, 5 Drawing Sheets

(56) References Cited

OTHER PUBLICATIONS

Chen et al., "Utilizing History Information in Acquiring Strategies for Board Game Geister by Deep Counterfactual Regret Minimization," The 24th Game Programming Workshop, 2019, pp. 20-27.
Crosby et al., "BlockChain Technology: Beyond Bitcoin," Sutardja Center for Entrepreneurship & Technology Technical Report, Oct. 16, 2015, 35 pages.
Davis et al., "Low-Variance and Zero-Variance Baselines for Extensive-Form Games," arXiv:1907.09633v1, Jul. 2019, 21 pages.
European Search Report in European Application No. 19789849.7 dated Jan. 8, 2020, 8 pages.
Gibson et al., "Efficient Monte Carlo Counterfactual Regret Minimization in Games with Many Player Actions," Department of Computing Science, University of Alberta, NIPS'12 Proceedings of the 25th International Conference on Neural Information Processing Systems, 2012, 9 pages.
Hu et al., "Online Counterfactual Regret Minimization in Repeated Imperfect Information Extensive Games," Journal of Computer Research and Development, 2014, 51(10): 2160-2170 (with English Abstract).
Johanson et al., "Efficient Nash Equilibrium Approximation through Monte Carlo Counterfacutal Regret Minimization," Conference: Autonomous Agents and Multiagent Systems, May 2012, 8 pages.
Johanson et al., zinkevich.org [online], "Accelerating Best Response Calculation in Large Extensive Games," Jul. 2011, retrieved on Feb. 14, 2020, retrieved from URL<http://martin.zinkevich.org/publications/ijcai2011_rgbr.pdf>, 8 pages.
Lanctot et al., "Monte Carlo Sampling for Regret Minimization in Extensive Games," Advances in Neural Information Processing Systems, 2009, 4 pages.
Li et al., "Double Neural Counterfactual Regret Minimization," Georgia Institute of Technology, 2018, pp. 1-20.
Lisy et al, "Online Monte Carlo Counterfactual Regret Minimization for Search in Imperfect Information Games," International Conference on Autonomous Agents and Multiagent Systems, May 2015, pp. 27-36.
Liu et al., "A Game Theoretic Approach for Attack Prediction," Department of Information Systems, UMBC, 2002, 20 pages.
Nakamoto, "Bitcoin: A Peer-to-Peer Electronic Cash System," www.bitcoin.org, 2005, 9 pages.
Neller et al., "Approximating Optimal Dudo Play with Fixed-Strategy Iteration Counterfacutal Regret Minimization," Advances in Computer Games: 13th International Conference, Jan. 2012, 14 pages.
Schmid et al., "Variance Reduction in Monte Carlo Counterfactual Regret Minimization (VR-MCCFR_ for Extensive Form Games using Baselines," arXiv:1809.03057v1, Sep. 2018, 13 pages.
Teng, "Research on Texas Poker Game Based on Counterfactual Regret Minimization Algorithm," China Masters' Theses Full-text Database, Dec. 2015, 65 pages (with English Abstract).
Zheng et al. "Clustering routing algorithm of wireless sensor networks based on Bayesian game," Journal of Systems Engineering and Electronics, 2012, 23(1):154-159.
Zhou et al. "Lazy-CFR: a fast regret minimization algorithm for extensive games with Imperfect Information," Cornell University, 2018, arXiv:1810.04433v2, 10 pages.
Zinkevich et al., "Regret Minimization in Games with Incomplete Information," Neural Information Processing Systems, 2007, 14 pages.
U.S. Appl. No. 16/448,390, Li et al., filed Jun. 21, 2019.
U.S. Appl. No. 16/448,947, Li et al., filed Jun. 21, 2019.
U.S. Appl. No. 16/712,037, Li et al., filed Dec. 12, 2019.
U.S. Appl. No. 16/712,092, Li et al., filed Dec. 12, 2019.
U.S. Appl. No. 16/712,509, Li et al., filed Dec. 12, 2019.

* cited by examiner

DETERMINING ACTION SELECTION POLICIES OF AN EXECUTION DEVICE

CROSS-REFERENCE TO RELATED APPLICATIONS

This application is a continuation of PCT Application No. PCT/CN2019/087003, filed on May 15, 2019, which is hereby incorporated by reference in its entirety.

TECHNICAL FIELD

This specification relates to determining action selection policies for an execution device for completing a task in an environment that includes the execution device and one or more other devices.

BACKGROUND

Strategic interaction between two or more parties can be modeled by a game that involves two or more parties (also referred to as players). In an Imperfect Information Game (IIG) that involves two or more players, a player only has partial access to the knowledge of her opponents before making a decision. This is similar to real-world scenarios, such as trading, traffic routing, and public auction. Many real life scenarios can be represented as IIGs, such as commercial competition between different companies, bidding relationships in auction scenarios, game relationships between a fraud party and an anti-fraud party.

Methods for solving an IIG are of great economic and societal benefits. Due to the hidden information, a player has to reason under the uncertainty regarding her opponents' information, and she also needs to act so as to take advantage of her opponents' uncertainty regarding her own information.

SUMMARY

This specification describes technologies for determining an action selection policy for an execution device for completing a task in an environment that includes the execution device and one or more other devices, for example, for strategic interaction between the execution device and the one or more other devices. For example, the execution device can perform a computer-implemented method for searching for a Nash equilibrium of a game between the execution device and one or more other devices. In some embodiments, these technologies can involve performing a fast asynchronous counterfactual regret minimization (CFR) algorithm for solving an imperfect information game (IIG). In some embodiments, the technologies can reduce the computational complexity and variance, while improving the convergence speed of the CFR algorithm.

This specification also describes one or more non-transitory computer-readable storage media, coupled to one or more processors and having instructions stored thereon which, when executed by the one or more processors, cause the one or more processors to perform operations in accordance with embodiments of the methods provided herein.

This specification further describes a system for implementing the methods described herein. The system includes one or more processors, and a computer-readable storage medium coupled to the one or more processors having instructions stored thereon which, when executed by the one or more processors, cause the one or more processors to perform operations in accordance with embodiments of the methods provided herein.

Methods, systems, and computer media in accordance with this specification may include any combination of the aspects and features described herein. That is, methods in accordance with this specification are not limited to the combinations of aspects and features specifically described herein, but also include any combination of the aspects and features described.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
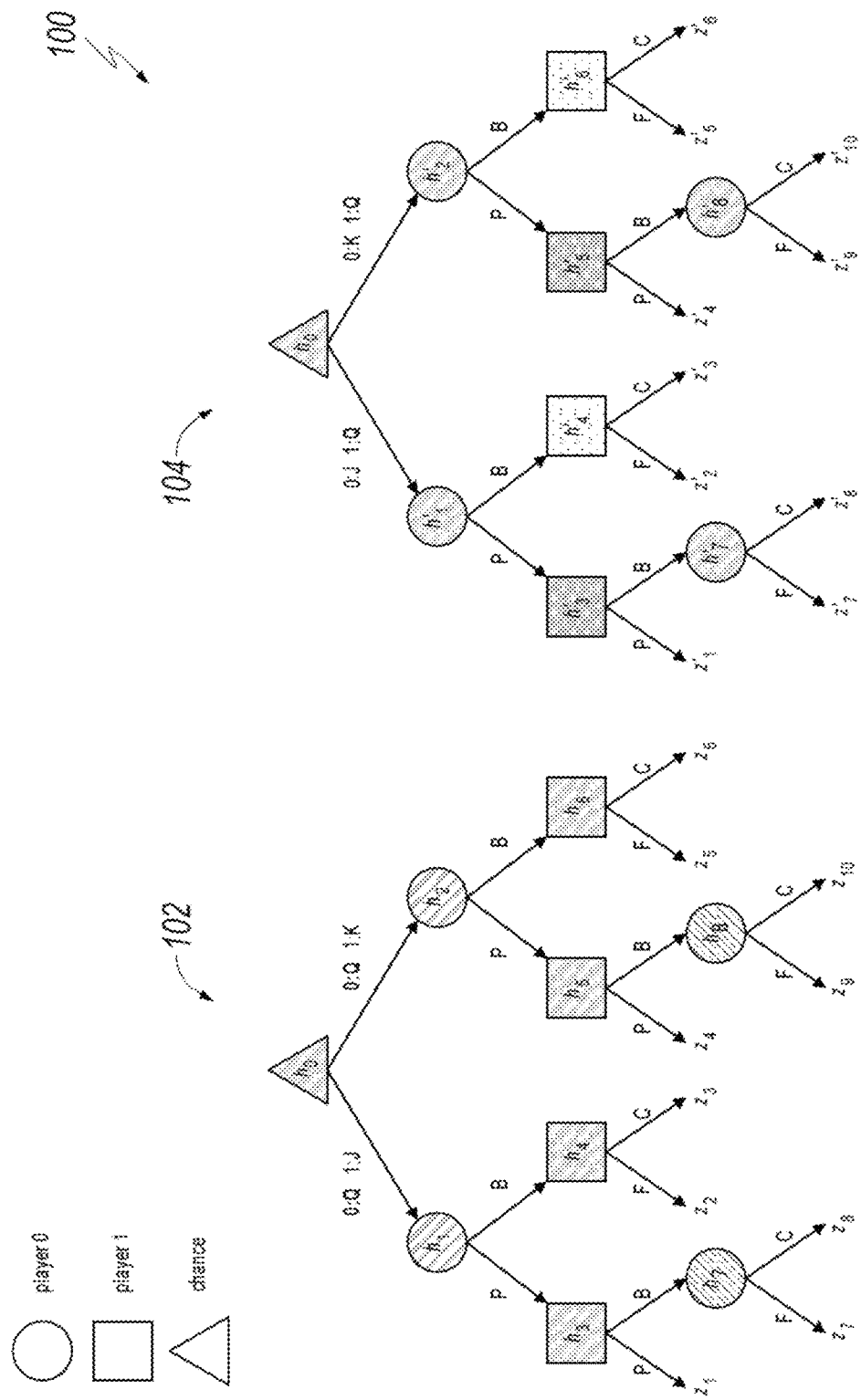
FIG. 1 is a diagram illustrating examples of partial game trees in one-card poker, in accordance with embodiments of this specification.

This specification describes technologies for determining an action selection policy for an execution device for completing a task in an environment that includes the execution device and one or more other devices, for example, for strategic interaction between the execution device and the one or more other devices. For example, the execution device can perform a computer-implemented method for searching for a Nash equilibrium of a game between the execution device and one or more other devices. In some embodiments, these technologies can involve performing a fast asynchronous counterfactual regret minimization (CFR) algorithm for solving an imperfect information game (IIG). In some embodiments, the technologies can reduce the computational complexity and variance, while improving the convergence speed of the CFR algorithm.

An IIG can represent one or more real-world scenarios such as resource allocation, product/service recommendation, cyber-attack prediction and/or prevention, traffic routing, fraud management, that involve two or more parties (also referred to as players), where each party may have incomplete or imperfect information about the other party's decisions.

Nash equilibrium is a typical solution for an IIG that involves two or more players. Counterfactual Regret Minimization (CFR) is an algorithm designed to approximately find Nash equilibrium for large games. CFR tries to minimize overall counterfactual regret. It is proven that the average of the strategies in all iterations would converge to a Nash equilibrium. When solving a game, CFR in its original form (also referred to as original CFR, standard CFR, vanilla CFR, or simply, CFR) traverses the entire game tree in each iteration. Thus, the original CFR requires large memory for large, zero-sum extensive games such as heads-up no-limit Texas Hold'em. In some instances, the original CFR may not handle large games with limited memory.

A Monte Carlo CFR (MCCFR) was introduced to minimize counterfactual regret. The MCCFR can compute an unbiased estimation of counterfactual value and avoid traversing the entire game tree. Since only subsets of all information sets are visited in each iteration, MCCFR requires less memory than the original CFR.

MCCFR can be performed with an outcome sampling algorithm or an external sampling algorithm. The outcome sampling algorithm in MCCFR has a large variance, and it is difficult to converge to an approximate Nash equilibrium solution in fewer iteration steps. The external sampling algorithm in MCCFR has a smaller variance than the outcome sampling algorithm, but this method presents similar disadvantages to CFR. When the game tree is large, it requires a very large memory space and cannot be extended to a complex large-scale IIG.

In some embodiments, an extensive-form game with a finite set $N=\{0, 1, \ldots, n-1\}$ of players can be represented as follows: define $h^v_i$ as a hidden variable of player i in an IIG. For example, in a poker game, $h^v_i$ can refer to the private cards of player i. H refers to a finite set of histories. Each member $h=(h_1^v)_{i=0, 1, \ldots, n-1}(a_l)_{l=0, \ldots, L-1} = h_0'h_1^v \ldots h_{n-1}^v a_0 a_1 \ldots a_{L-1}$ of H denotes a possible history (or state), which includes each player's hidden variable and L actions taken by players including chance. For player i, h also can be denoted as $h_1'h_{-i}^v a_0 a_1 \ldots a_{L-1}$, where $h_{-i}^v$ refers to the opponent's hidden variables. The empty sequence Ø is a member of H. The expression $h_j \sqsubseteq h$ denotes that $h_j$ is a prefix of h, where $h_j=(h_1^v)_{i=0, 1, \ldots, n-1}(a_l)_{l=1, \ldots, L'-1}$ and $0<L'<L$. $Z \subseteq H$ denotes the terminal histories and any member $z \subseteq Z$ is not a prefix of any other sequences. $A(h)=\{a: ha \in H\}$ is the set of available actions after non-terminal history $h \in H\backslash Z$. A player function P assigns a member of $N \cup \{c\}$ to each non-terminal history, where c denotes the chance player identifier (ID), which typically can be, for example, -1. P(h) is the player who takes an action after history h.

$I_i$ of a history $\{h \in H: P(h)=i\}$ is an information partition of player i. A set $I_i \in \mathcal{I}_i$ is an information set of player i. $I_i(h)$ refers to information set $I_i$ at state h. In some embodiments, $I_i$ could only remember the information observed by player i including player i's hidden variable and public actions. Therefore $I_i$ indicates a sequence in the IIG, i.e., $h^v_i a_0 a_2 \ldots a_{L-1}$. In some embodiments, for $I_i \in \mathcal{I}_i$ and for any $h \in I_i$, the set A(h) can be denoted by $A(I_i)$ and the player P(h) is denoted by $P(I_i)$. For each player $i \in N$, a utility function $u_i(z)$ defines a payoff of a terminal state z. A more detailed explanation of these notations and definitions will be discussed below and will include an example shown in FIG. 1.

FIG. 1 is a diagram 100 illustrating examples of partial game trees 102 and 104 in One-Card Poker, in accordance with embodiments of this specification. One-Card Poker is a two-player IIG of poker. One-Card Poker is an example of an extensive-form game. The game rules are defined as follows. Each player is dealt one card from a deck of X cards. The first player can pass or bet. If the first player bets, the second player can call or fold. If the first player passes, the second player can pass or bet. If second player bets, the first player can fold or call. The game ends with two passes, a call, or a fold. The folding player will lose 1 chip. If the game ended with two passes, the player with the higher card wins 1 chip. If the game ends with a call, the player with the higher card wins 2 chips.

A game tree is a directed graph. The nodes of the game tree represent positions (or states of a player) in a game and of the game tree can represent moves or actions of a player of the game. In FIG. 1, $z_i$ denotes a terminal node, representing a terminal state, and $h_1$ denotes a non-terminal node. Each of the partial game trees 102 and 104 has a root node $h_0$ representing a chance. There are 19 distinct nodes in the first partial game tree 102, corresponding to 9 non-terminal nodes $h_1$ including chance $h_0$ and 10 terminal nodes $z_i$ in the left tree.

In the first partial game tree 102, two players (player 0 and player 1) are dealt (queen, jack) as shown as "0:Q 1:J" in the left subtree and (queen, king), as shown as "0:Q 1:K" in the right subtree.

The trajectory from the root node to each node is a history of actions. Actions are represented by letters (e.g., F, C, P, and B) or representations (e.g., "0:Q 1:J") next to edges (denoted by arrows) of the game tree. The letters F, C, P, B refer to fold, call, pass, and bet, respectively.

In an extensive-form game, $h_1$ refers to the history of actions. For example, as illustrated in the first partial game tree 102, $h_3$ includes actions 0:Q, 1:J and P. $h_7$ includes actions 0:Q, 1:J, P and B. $h_8$ includes actions 0:Q, 1:K, P and B. In the first partial game tree 102, $h_3 \sqsubseteq h_7$, that is, $h_3$ is a prefix of $h_7$. $A(h_3)=\{P,B\}$ indicating that the set of available actions after non-terminal history $h_7$ are P and B. $P(h_3)=1$ indicating that the player who takes an action after history $h_3$ is player 1.

In the IIG, the private card of player 1 is invisible to player 0, therefore $h_7$ and $h_8$ are actually the same for player 0. An information set can be used to denote the set of these undistinguished states. Similarly, $h_1$ and $h_2$ are in the same information set. For the right partial game tree 104, $h_3'$ and $h_5'$ are in the same information set; $h_4'$ and $h_6'$ are in the same information set.

Typically, any $I_i \in \mathcal{I}$ could only remember the information observed by player i including player i's hidden variables and public actions. For example, as illustrated in the first partial game tree 102, the information set of $h_7$ and $h_8$ indicates a sequence of 0:Q, P, and B. Because $h_7$ and $h_8$ are undistinguished by player 0 in the IIG, if Jo is the information set of $h_7$ and $h_8$, $I_0=I_0(h_7)=I_0(h_8)$.

A strategy profile $\sigma=\{\sigma_i | \sigma_i \in \Sigma_i, i \in N\}$ is a collection of strategies for all players, where $\Sigma_i$ is the set of all possible strategies for player i. $\sigma_{-i}$ refers to strategy of all players other than player i. For player $i \in N$, the strategy $\sigma_i(I_i)$ is a function, which assigns an action distribution over $A(I_i)$ to information set $I_i$. $\sigma_i(I_i)$ which denotes the probability of action a taken by player $i \in N \cup \{c\}$ at state h. In an IIG, if two or more states have the same information set, the two or more states have a same strategy. That is, $\forall h_1, h_2 \in I_i$, $I_i=I_i(h_1)=I_i(h_2)$, $\sigma_i(I_i)=\sigma_i(h_1)=\sigma_i(h_2)$, $\sigma_i(a|I_i)=\sigma_i(a|h_2)$. For example, $I_0$ is the information set of $h_7$ and $h_8$, $I_0=I_0(h_7)=I_0(h_8)$, $\sigma_0(I_0)=\sigma_0(h_7)=\sigma_0(h_8)$, $\sigma_0(a|I_0)\sigma_0(a|h_7)=\sigma_0(a|h_8)$. In FIG. 1, the same shading (other than the gray ones) is used to represent the same information set in respective state.

For player i, the expected game utility of the strategy profile a is denoted as $u_i^\sigma=\Sigma_{z \in Z}\pi^\sigma(z)u_i(z)$, which is the expected payoff of all possible terminal nodes. Given a fixed strategy profile $\sigma_{-i}$, any strategy $\sigma_i^*=\arg\max_{\sigma_i' \in \Sigma_i} u_i^{(\sigma_i', \sigma_{-i})}$ of player i that achieves maximize payoff against $\pi_{-i}^\sigma$ is a best response. For two players' extensive-form games, a Nash equilibrium is a strategy profile $\sigma^*=(\sigma_0^*,\sigma_1^*)$ such that each player's strategy is a best response to the opponent. An $\epsilon$-Nash equilibrium is an approximation of a Nash equilibrium, whose strategy profile $\sigma^*$ satisfies: $\forall_i \in N, u_i^{\sigma_i}+\epsilon \geq \max_{\sigma_i' \in \Sigma_i} u_i^{(\sigma_i',\sigma-i)}$.

Exploitability of a strategy $\sigma_i$ can be defined as $\epsilon_i(\sigma_i)=u_i^{\sigma^*}-u_i^{(\sigma_i,\sigma^{*-i})}$. A strategy is unexploitable if $\epsilon_i(\sigma_i)=0$. In large two player zero-sum games such as poker, $u_i^{\sigma^*}$ can be intractable to compute. However, if the players alternate their positions, the value of a pair of games is zero, i.e., $u_0^{\sigma^*}+u_1^{\sigma^*}=0$. The exploitability of strategy profile a can be defined as $\epsilon(\sigma)=(u_1^{(\sigma_0,\sigma_1^*)}+u_0^{(\sigma_0^*,\sigma_1)})/2$.

For iterative methods such as CFR, at can refer to the strategy profile at the t-th iteration. The state reach probability of history h can be denoted by $\pi^\sigma(h)$ if players take actions according to a. For an empty sequence $\pi^\sigma(\emptyset)=1$. The reach probability can be decomposed into $\pi^\sigma(h)=Å_{i \in N \cup \{c\}}\pi_i^\sigma(h)=\pi_i^\sigma(h)\pi_{-i}^{\sigma(h)}$ according to each player's contribution, where $\pi_i^\sigma(h)=Å_{h'a \sqsubseteq h, P(h')=P(h)}\sigma_i(a|h')$ and $\pi_{-i}^\sigma(h)=Å_{h'a \sqsubseteq h, P(h') \neq P(h)}\sigma_{-i}(a|h')$.

The reach probability of information set $I_i$ (also referred to as information set reach probability) can be defined as $\pi^\sigma(I_i)=\Sigma_{h \in I_i}\pi^\sigma(h)$. If $h' \sqsubseteq h$, the interval state reach probability from state h' to h can be defined as $\pi^\sigma(h',h)$, then $\pi^\sigma(h',h)=\pi^\sigma(h)/\pi^\sigma(h')$. The reach probabilities $\pi_i^\sigma(I_i)$, $\pi_{-i}^\sigma(I_i)$, $\pi_i^\sigma(h',h)$, and $\pi_{-i}^\sigma(h',h)$ can be defined similarly.

In large and zero-sum IIGs, CFR is proved to be an efficient method to compute Nash equilibrium. It is proved that the state reach probability of one player is proportional to posterior probability of the opponent's hidden variable, i.e., $p(h_{-i}^v|I_i) \propto \pi_{-i}^\sigma(h)$, where $h_i^v$ and $I_i$ indicate a particular h.

For player i and strategy profile a, the counterfactual value (CFV) $v_i^\sigma(h)$ at state h can be defined as:

$$v_i^\sigma(h)=\Sigma_{h \sqsubseteq z, z \in Z}\pi_{-i}^\sigma(h)\pi^\sigma(h,z)u_i(z)=\Sigma_{h \sqsubseteq z, z \in Z}\pi_i^\sigma(h,z)u_i'(z) \quad (1)$$

where $u_i'(z)=\pi_{-i}^\sigma(z)u_i(z)$ is the expected reward of player i with respect to the approximated posterior distribution of the opponent's hidden variable. Then the counterfactual value of information set $I_i$ is $v_i^\sigma(I_i)=\ominus_{h \in I_i}v_i^\sigma(h)$.

The action counterfactual value of taking action a can be denoted as $v_i^\sigma(a|h)=v_i^\sigma(ha)$ and the regret of taking this action is:

$$r_i^\sigma(a|h)=v_i^\sigma(a|h)-v_i^\sigma(h) \quad (2).$$

Similarly, the CFV of information set $I_i$ can be defined as $v_i^{\sigma(I)}=\Sigma_{h \in I_i}v_i^\sigma(h)$, while the CFV of its action a is $v_i^\sigma(a|I_i)=\Sigma_{z \in Z, h \sqsubseteq z, h \in I_i}\pi_i^{\sigma(h,z)}u_i'(z)$ and the regret of action a given the information set $I_i$ can be defined as:

$$r_i^\sigma(a|I_i) = v_i^\sigma(a|I_i) - v_i^\sigma(I_i) = \quad (3)$$

$$\sum_{z \in Z, ha \sqsubseteq z, h \in I_i} \pi_i^\sigma(ha, z)u_i'(z) - \sum_{z \in Z, h \sqsubseteq z, h \in I_i} \pi_i^\sigma(h, z)u_i'(z),$$

where $$u_i^\sigma(I_i) = \frac{\sum_{h \in I_i} v_i^\sigma(h)}{\sum_{h \in I_i} \pi_{-i}^\sigma(h)} = \frac{\sum_{h \in I_i} v_i^\sigma(h)}{\pi_{-i}^\sigma(I_i)}.$$

Note that, in imperfect information game, $\pi_{-i}^\sigma(I_i)=\pi_{-i}^\sigma(h)$.

Then, the accumulative regret of action a after T iterations can be calculated or computed according to Eq. (4):

$$R_i^T(a|I_i) = \sum_{t=1}^{T}\left(v_i^{\sigma^t}(a|I_i) - v_i^{\sigma^t}(I_i)\right) = R_i^{T-1}(a|I_i) + r_i^{\sigma^T}(a|I_i) \quad (4)$$

where $R_i^0(a|I_i)=0$. Defining $R_i^{T,+}(a|I_i)=\max(R_i^T(a|I_i), 0)$, the current strategy (or iterative strategy or behavior strategy) at T+1 iteration can be updated, for example, based on regret matching (RM), according to Eq. (5) below:

$$\sigma_i^{T+1}(a|I_i) = \begin{cases} \dfrac{R_i^{T,+}(a|I_i)}{\sum_{a \in A(I_i)} R_i^{T,+}(a|I_i)}, & \text{if } \sum_{a \in A(I_i)} R_i^{T,+}(a|I_i) > 0 \\ \dfrac{1}{|A(I_i)|}, & \text{otherwise} \end{cases} \quad (5)$$

The average strategy $\overline{\sigma}_i^T$ from iteration 1 to T can be defined as:

$$\overline{\sigma}_i^T(a|I_i) = \frac{\sum_{t=1}^{T} \pi_i^{\sigma^t}(I_i)\sigma_i^t(a|I_i)}{\sum_{t=1}^{T} \pi_i^{\sigma^t}(I_i)} \quad (6)$$

where $\pi_i^{\sigma^t}(I_i)$ denotes the information set reach probability of $I_i$ at t-th iteration and is used to weigh the corresponding current strategy $\sigma_i^t(a|I_i)$.

If $s^t(a|I_i)=\pi_i^{\sigma^t}(I_i)\sigma_i^t(a|I_i)$ is defined as an additional numerator in iteration t, then the accumulative numerator of the average strategy $\overline{\sigma}_i^T$ can be defined as:

$$S^T(a|I_i) = \sum_{t=1}^{T} \pi_i^{\sigma^t}(I_i)\sigma_i^t(a|I_i) = S^{T-1}(a|I_i) + s_i^T(a|I_i), \quad (7)$$

where $S^0(a|I_i)=0$.

In some embodiments, the CFV in the original CFR as defined in Eq. (1) can be rewritten as $$v_i^{\sigma^t}(I_i)=\Sigma_{a \in A(I_i)}\sigma_i^t(a|I_i)v_i^t(a|I_i) \quad (8)$$

which is a weighted summation from leaf nodes to a root node of a game tree recursively.

In some embodiments, in a fast asynchronous CFR, unlike the CFV in the original CFR as defined in Eq. (9), after obtaining the probability $\sigma_i^{t+1}(a|I_i)$ according to Eq. (5), the CFV given the information set $I_i$ can be updated based on the probability $\sigma_i^{t+1}(a|I_i)$ to speed up the convergence of the CFR algorithm. For example, a fictitious counterfactual value (FCFV), $\check{v}_i^{t+1}(I_i)$ can be defined as:

$$\check{v}_i^{\sigma^{t+1}}(I_i)=\Sigma_{a \in A(I_i)}\pi_i^{t+1}(a|I_i)v_i^t(a|I_i) \quad (9)$$

Figure 2:
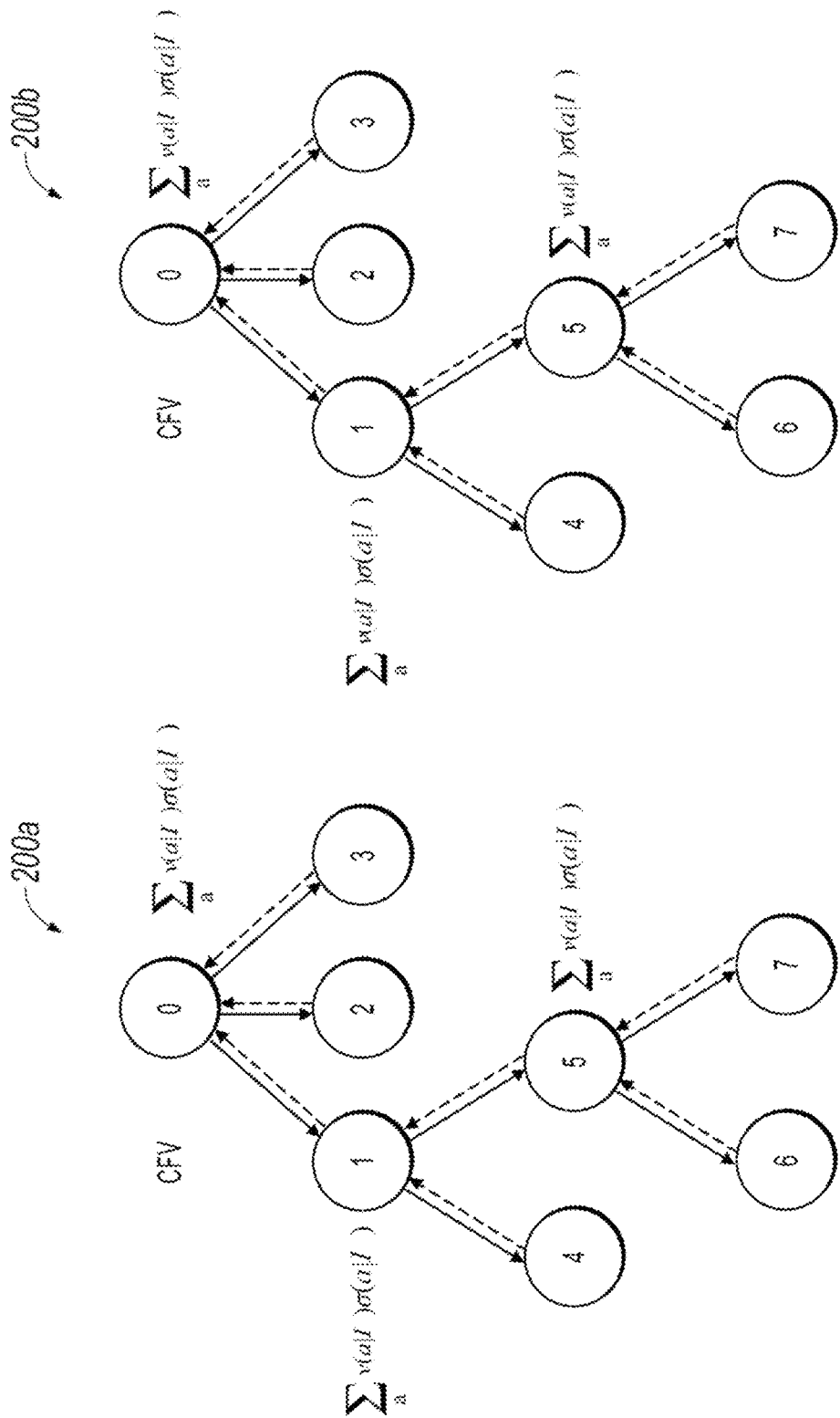
FIG. 2 is a diagram illustrating examples of an original CFR algorithm and a fast asynchronous CFR algorithm applied on a partial game tree, in accordance with embodiments of this specification.

For the FCFV in Eq. (9), $\check{v}_i^{\sigma^{t+1}}(I_i)$ is used to replace $v_i^{\sigma^t}(I_i)$, i.e., $v_i^{\sigma^t}(I_i)=\check{v}_i^{\sigma^{t+1}}(I_i)$ which is used for calculating $r_i^\sigma(a|I_i)$ of an action a in the previous state that leads to current state with the information set $I_i$. In some embodiments, only the counterfactual value of those nodes whose children nodes have all been visited can be replaced by the FCFV. FIG. 2 shows an example updating process of a FCFV, compared to the original CFV of a node in a game tree.

In some embodiments, the FCFV $\check{v}_i^{\sigma^{t+1}}(I_i)$ as defined in Eq. (9) can be calculated right after the iterative strategy of $I_i$, $\sigma_i^{t+1}(a|I_i)$ has been calculated, for example, according to Eq. (5). After that, $v_i^{\sigma^t}(I_i) = \check{v}_i^{\sigma^{t+1}}(I_i)$, that is, the FCFV is used as the CFV. Therefore, there is no need for memory to store $\check{v}_i^{\sigma^{t+1}}(I_i)$. As such, the memory efficiency and space complexity of the fast asynchronous CFR algorithm can be comparable to the original CFR algorithm.

When solving a game, the original CFR traverses the entire game tree in each iteration. Thus, the original CFR may not handle large games with limited memory. A Monte Carlo CFR (MCCFR) was introduced to minimize counterfactual regret. The MCCFR can compute an unbiased estimation of counterfactual value and avoid traversing the entire game tree. Since only subsets of all information sets are visited in each iteration, MCCFR requires less memory than the original CFR.

For example, define $Q=\{Q_1, Q_2, \ldots, Q_m\}$, where $Q_j \in Z$ is a block of sampling terminal histories in each iteration, such that $Q_j$ spans the set Z. Generally, different $Q_j$ may have an overlap according to a specified sampling scheme. Several sampling schemes can be used.

FIG. 2 is a diagram illustrating examples 200a and 200b of an original CFR algorithm and a fast asynchronous CFR algorithm applied on a partial game tree, respectively, in accordance with embodiments of this specification. In both examples 200a and 200b, the partial game tree includes nodes 0, 1, 2, . . . , and 7, where the node 0 is a root node and nodes 6 and 7 are the leaf nodes. The node i correspond to an information set P.

The example 200a shows the CFV updating process of an original CFV algorithm. In each iteration, the original CFR needs to maintain a current strategy, and use the current strategy to generate the CFV (e.g., according to Eq. (1) or (9)), and use the regret matching algorithm (e.g., according to Eq. (5)) to calculate a current strategy of the next iteration. The weighted average of the current strategies for all iterative processes can converge to a Nash Equilibrium.

The example 200b shows a FCFV updating process of a fast asynchronous CFR algorithm. In some embodiments, in each iteration, the fast asynchronous CFR algorithm can traverse the entire game tree, and uses a bottom-up process to update the CFV of each node of the tree. For example, as shown in 200b, since node 6 and node 7 are leaf nodes, their CFVs can be considered as their respective FCFVs. In a current iteration (e.g., the (t)-th iteration), for node 5, the CFV of node 5, $v^t(I^5)$, can be calculated based on strategy $\sigma^t$, for example, according to $v^t(I^5) = \sum_a v^t(a|I^5) \sigma^t(a|I^5) = v(a_6|I^5) \sigma^t(a_6|I^5) + v(a_7|I^5) \sigma^t(a_7|I^5)$, wherein $v^t(a_6|I^5)$ is the CFV of the action $a_6$ leading to node 6 and $v^t(a_7|I^5)$ is the CFV of the action $a_7$ leading to the node 7 in the current iteration.

The regret values of the node 5 in the current iteration can be calculated based on the CFV of node 5, $v^t(I^5)$. For example, an iterative regret value of action $a_6$ in the state of the node 5 in the (t)-th iteration can be calculated according to $r^t(a_6|I^5) = v^t(a_6|I^5) - v^t(I^5)$. An accumulative regret of action $a_6$ in the state of the node 5 after t iterations can be computed according to Eq. (4), such as, $$R^t(a_6|I^5) = \sum_{t_i=1}^{t}(v^{t_i}(a_6|I^5) - v^{t_i}(I^5)) = R^{t-1}(a_6|I^5) + r^t(a_6|I^5).$$

Similarly, an iterative regret value of action $a_7$ in the state of the node 5 can be calculated according to $r^t(a_7|I^5) = v^t(a_7|I^5) - v^t(I^5)$. An accumulative regret of action $a_7$ in the state of the node 5 after t iterations can be computed according to Eq. (4), such as, $$R^t(a_7|I^5) = \sum_{t_i=1}^{t}(v^{t_i}(a_7|I^5) - v^{t_i}(I^5)) = R^{t-1}(a_7|I^5) + r^t(a_7|I^5).$$

Based on the accumulative regret values, iterative strategies of the two actions $a_6$ and $a_7$ at node 5 can be calculated, for example, according to the regret matching as shown in Eq. (5). In some embodiments, the iterative strategies of the two actions $a_6$ and $a_7$ at node 5 (e.g., $\sigma_5^{T+1}(a_6|I_5)$ and $\sigma_5^{T+1}(a_7|I_5)$ in Eq. (5)) can be denoted as $f^{t+1}(a_6|I^5)$ and $f^{t+1}(a_7|I^5)$ as the iterative strategies and can be used as the strategies of at node 5 for traversing the game tree in the next iteration (e.g., (t+1)-th iteration). The iterative strategies can represent probabilities of each of the two actions $a_6$ and $a_7$ at node 5 that lead to node 6 and node 7, respectively. An average strategy over iterations 1 to t at node 5, $\bar{\sigma}^t(a|I_5)$, can be computed based on iterative strategies $f^{t+1}(a_6|I^5)$ and $f^{t+1}(a_7|I^5)$, for example, according to Eq. (6). The average strategy $\bar{\sigma}^t(a|I_5)$ can be output to approximate Nash equilibrium and to control the action of the party at node 5, if the convergence condition it met.

The FCFV of node 5, $\check{v}^t(I^5)$, in the (t)-th iteration can be calculated based on the iterative strategy $f^{t+1}$, for example, according to $\check{v}^t(I^5) = \sum_a v^t(a|I^5) f^{t+1}(a|I^5) = v(a_6|I^5) f^{t+1}(a_6|I^5) + v(a_7|I^5) f^{t+1}(a_7|I^5)$. The FCFV of node 5, $\check{v}^t(I^5)$, can be used to replace the CFV of the node 5 such as the CFV of the action $a_5$ leading to the node 5 at the parent node of node 5 that is, node 1, in the current iteration, $v^t(a_5|I^1)$ is that is, $v^t(a_5|I^5) = \check{v}^t(I^5)$, for example, for calculating the CFV of the parent node of node 5, that is, node 1 as shown in 200b.

For example, as shown in 200b, node 1 has two actions (denoted as $a_4$ and $a_5$) leading to node 4 and node 5, respectively. Since node 4 is a leaf node, the CFV of the node 4 is the CFV of the action $a_4$ leading to node 4. Accordingly, for node 1, the CFV of node 1, $v^t(I^1)$, can be calculated based on strategy $\sigma^t$, for example, according to $v^t(I^1) = \sum_a v^t(a|I^1) \sigma^t(a|I^1) = v(a_4|I^1) \sigma^t(a_4|I^1) + v(a_5|I^1) \sigma^t(a_5|I^1)$, wherein $v^t(a_4|I^1)$ is the CFV of the action $a_4$ leading to node 4 and $v^t(a_5|I^1)$ is the CFV of the action $a_5$ leading to the node 5 in the current iteration, which is updated to be the FCFV of node 5 computed as described above.

An iterative regret value of action $a_4$ in the state of the node 1 in the (t)-th iteration can be calculated according to $r^t(a_4|I^1) = v^t(a_4|I^1) - v^t(I^1)$. An accumulative regret of action $a_4$ in the state of the node 1 after t iterations can be computed according to Eq. (4), such as, $$R^t(a_4|I^1) = \sum_{t_i=1}^{t}(v^{t_i}(a_4|I^1) - v^{t_i}(I^1)) = R^{t-1}(a_4|I^1) + r^t(a_4|I^1).$$

Similarly, an iterative regret value of action $a_5$ in the state of the node 1 can be calculated according to $r^t(a_5|I^1) = v^t(a_5|I^{11}) - v^t(I^1)$. An accumulative regret of action $a_5$ in the state of the node 1 after t iterations can be computed according to Eq. (4), such as, $$R^t(a_5 \mid I^1) = \sum_{t_i=1}^{t} (v^{t_i}(a_5 \mid I^1) - v^{t_i}(I^1)) = R^{t-1}(a_5 \mid I^1) + r^t(a_5 \mid I^1).$$

Based on the regret values of the node 1, iterative strategies of node 1 in the next iteration (denoted as $f^{t+1}(a_4|I^1)$ and $f^{t+1}(a_5|I^1)$) of the two actions $a_4$ and $a_5$ at node 1 can be calculated, for example, according to the regret matching as shown in Eq. (5). The iterative strategies at node 1 can represent probabilities of each of the two actions $a_4$ and $a_5$ at node 1 that lead to node 4 and node 5, respectively. The iterative strategies at node 1 can be used to traverse the game tree at node 1 in the next iteration, the (t+1)-th iteration. An average strategy over iterations 1 to t at node 1, $\bar{\sigma}^t(a|I_1)$, can be computed based on iterative strategies $f^{t+1}(a_4|I^1)$ and $f^{t+1}(a_5|I^1)$, for example, according to Eq. (6). The average strategy $\bar{\sigma}^t(a|I_1)$ can be output to approximate Nash equilibrium and to control the action of the party at node 1, if the convergence condition it met.

The FCFV of node 1, $\check{v}(I^1)$, can be calculated based on the iterative strategy in the next iteration $f^{t+1}$, for example, according to $v(a_4|I^1)f^{t+1}(a_4|I^1)+v(a_5|I^1) f^{t+1}(a_5|I^1)$. The FCFV of node 1, $\check{v}(I^1)$, can be used to replace the CFV of the node 1, such as the CFV of the action $a_1$ leading to the node 1 from its parent node, node 0, in the current iteration, $v^t(a_1|I^0)$ is that is, $v^t(a_1|I^0)=\check{v}^t(I^1)$, for example, for calculating the CFV of the parent node of node 1, that is, node 0 as shown in 200b.

The above bottom-up process for calculating the FCFVs of nodes of the game tree can be continued until the root node is reached. In some embodiments, the FCFVs of nodes can be used in place of their respective CFVs for determining action selection policies (e.g., strategies), for example, by performing an original CFR, MCCFR, or any other variations of CFR algorithms.

Figure 3:
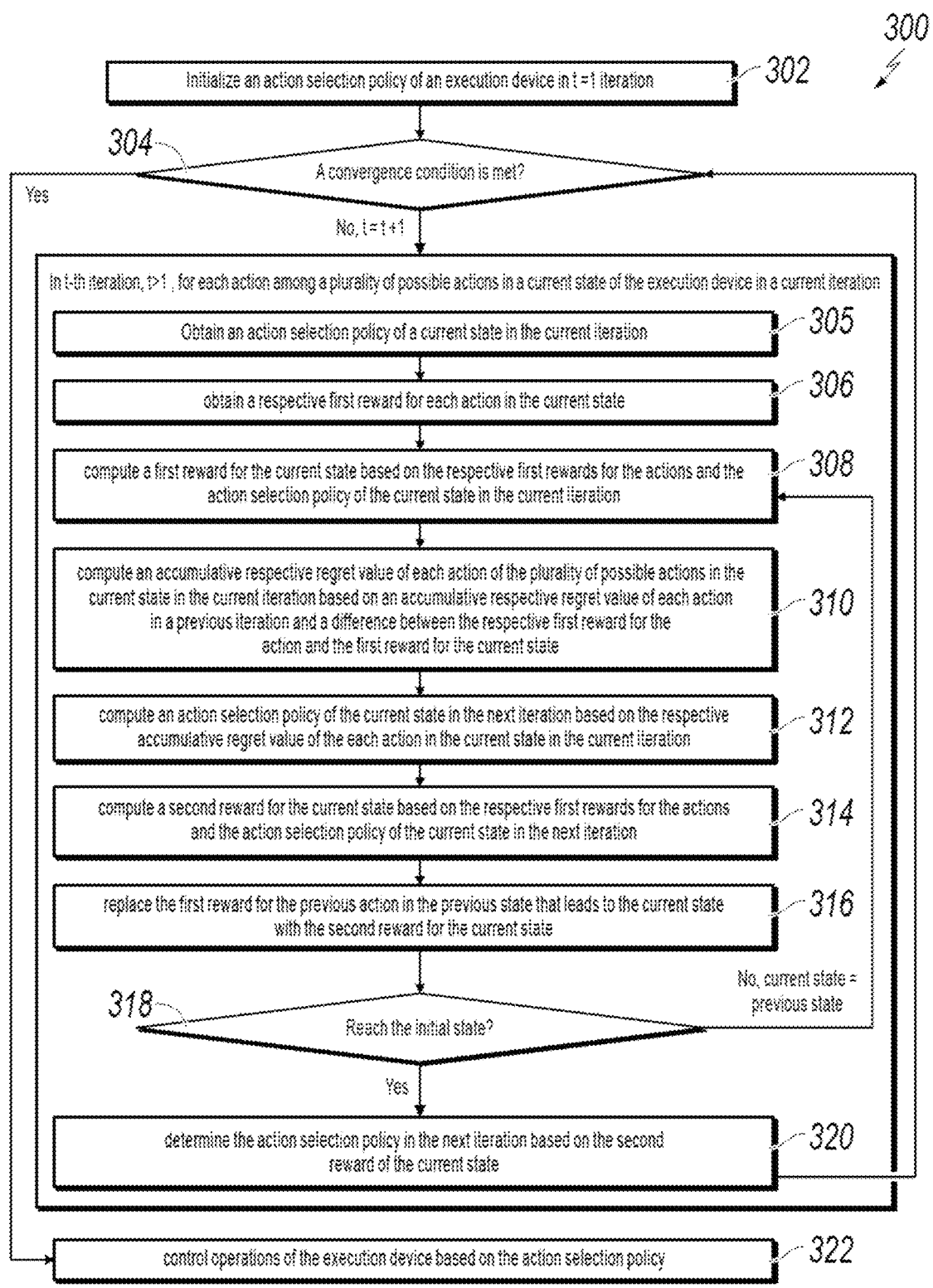
FIG. 3 is a flowchart of an example of a process for performing a fast asynchronous CFR for strategy searching in strategic interaction between two or more parties, in accordance with embodiments of this specification.

FIG. 3 is a flowchart of an example of a process for performing a fast asynchronous counterfactual regret minimization (CFR) for determining action selection policies for software applications in accordance with embodiments of this specification. The process 300 can be an example of the fast asynchronous CFR algorithm described above with respect to FIG. 2.

In some embodiments, the process 300 can be performed in an iterative manner, for example, by performing two or more iterations. In some embodiments, the process 300 can be used in automatic control, robotics, or any other applications that involve action selections. In some embodiments, the process 300 can be performed by an execution device for generating an action selection policy (e.g., a strategy) for completing a task (e.g., finding Nash equilibrium) in an environment that includes the execution device and one or more other devices. In some embodiments, the execution device can perform the process 300 in for controlling operations of the execution device according to the action selection policy.

In some embodiments, the execution device can include a data processing apparatus such as a system of one or more computers, located in one or more locations, and programmed appropriately in accordance with this specification. For example, a computer system 400 of FIG. 4, appropriately programmed, can perform the process 300. The execution device can be associated with an execution party or player. The execution party or player and one or more other parties (e.g., associated with the one or more other devices) can be participants or players in an environment, for example, for strategy searching in strategic interaction between the execution party and one or more other parties.

In some embodiments, the environment can be modeled by an imperfect information game (IIG) that involves two or more players. In some embodiments, the process 300 can be performed for solving an IIG, for example, by the execution party supported by the application. The IIG can represent one or more real-world scenarios such as resource allocation, product/service recommendation, cyber-attack prediction and/or prevention, traffic routing, fraud management, etc., that involve two or more parties, where each party may have incomplete or imperfect information about the other party's decisions. As an example, the IIG can represent a collaborative product-service recommendation service that involves at least a first player and a second player. The first player may be, for example, an online retailer that has customer (or user) information, product and service information, purchase history of the customers, etc. The second player can be, for example, a social network platform that has social networking data of the customers, a bank or another finical institution that has financial information of the customers, a car dealership, or any other parties that may have information of the customers on the customers' preferences, needs, financial situations, locations, etc. in predicting and recommendations of products and services to the customers. The first player and the second player may each have proprietary data that the player does not want to share with others. The second player may only provide partial information to the first player at different times. As such, the first player may only have limited access to information of the second player. In some embodiments, the process 300 can be performed for making a recommendation to a party with limited information of the second party, planning a route with limited information.

At 302, an action selection policy (e.g., a strategy a) in a first iteration, i.e., t=1 iteration, is initialized. In some embodiments, an action selection policy can include or otherwise specify a respective probability (e.g., $\sigma_i^t(a_j|I_i)$) of selecting an action (e.g., $a_j$) among a plurality of possible actions in a current state (e.g., state i) of the execution device (e.g., the device of the execution device that perform the process 300). The current state results from a previous action taken by the execution device in a previous state, and each action of the plurality of possible actions leads to a respective next state if performed by the execution device when the execution device is in the current state. In some embodiments, a state can be represented by a node (e.g., node 0~7 as shown in 200b with an corresponding information set) of the game tree that represents the environment and a plurality of possible actions in a state (e.g., node 5 as shown in 200b) can include the multiple actions (e.g., actions $a_3$ and $a_7$ as shown in 200b) of the state that leads to respective next states (e.g., node 3 and node 7 as shown in 200b). As shown in 200b, a state of the execution device (e.g., node 5) results from a previous action $a_5$ taken by the execution device in a previous state (e.g., node 1) and each action of the plurality of possible actions (e.g., actions $a_6$ and $a_7$) leads to a respective next state (e.g., nodes 6 and 7) if performed by the execution device when the execution device is in the current state (e.g., node 5).

In some embodiments, the strategy can be initialized, for example, based on an existing strategy, a uniform random strategy (e.g. a strategy based on a uniform probability distribution), or another strategy (e.g. a strategy based on a different probability distribution). For example, if the system warm starts from an existing CFR method (e.g., an original CFR or MCCFR method), the iterative strategy can be initialized from an existing strategy profile to clone existing regrets and strategy.

At 304, whether a convergence condition is met is determined. The convergence condition can be used for determining whether to continue or terminate the iteration. In some embodiments, the convergence condition can be based on exploitability of a strategy a. According to the definition of exploitability, exploitability should be large than or equal to 0. The smaller exploitability indicates a better strategy. That is, the exploitability of converged strategy should approach 0 after enough iterations. For example, in poker, when the exploitability is less than 1, the time-average strategy is regarded as a good strategy and it is determined that the convergence condition is met. In some embodiments, the convergence condition can be based on a predetermined number of iterations. For example, in a small game, the iterations can be easily determined by the exploitability. That is, if exploitability is small enough, the process 300 can terminate. In a large game, the exploitability is intractable, typically a large parameter for iteration can be specified. After each iteration, a new strategy profile can be obtained, which is better than the old one. For example, in a large game, the process 300 can terminate after a sufficient number of iterations.

If the convergence condition is met, no further iteration is needed. The process 300 proceeds to 322, operations of the execution device are controlled according to the action selection policy in the current iteration. If the convergence condition is not met, t is increased by 1, and the process 300 proceeds to a next iteration, wherein t>1.

In a current iteration (e.g., t-th iteration), for each action among a plurality of possible actions in a current state of the execution device, at 305, an action selection policy of a current state in the current iteration (e.g., the strategy $\sigma_i^t$) is obtained. In some embodiments, the action selection policy of the current state in the current iteration (e.g., the strategy $\sigma_i^t$) is obtained in a previous iteration, for example, according to Eq. (5).

At 306, a respective first reward for each action in the current state is obtained. In some embodiments, the respective first reward for each action represents a gain attributed to the action towards completing the task. For example, the first reward for each action can be a CFV of each action. In some embodiments, obtaining a respective first reward of the each action in the current state comprises obtaining a respective first reward of the each action in the current state by traversing a game tree that represents the environment based on an action selection policy of the current state in a previous iteration (e.g., the strategy $\sigma_i^{t-1}$).

In some embodiments, each iteration of the process 300 can include a bottom-up process for updating first rewards of the states. For example, the process 300 can start from terminal states (e.g., the leaf node 6 and node 7 as shown in 200b) and move up to the initial state (e.g., the root node 0 as shown in 200b). In some embodiments, for terminal nodes, a respective first reward of the each action in the terminal state can be the first reward of the terminal state (e.g., utility function $u_i(z)$ or a payoff of a terminal state z) because the terminal state has no further action leading to any next state.

At 308, a first reward for the current state is computed based on the respective first rewards for the actions and the action selection policy of the current state in the current iteration. In some embodiments, the first reward for the current state represents a gain attributed to the current state towards completing the task. For example, the first reward for the current state can be a CFV of the current state.

In some embodiments, computing a first reward of the current state (e.g., a non-terminal state) based on the respective first rewards for the actions and the action selection policy of the current state in the current iteration comprises computing the first reward of the current state based on a sum of the respective first rewards for actions weighted by corresponding probabilities of selecting the actions of the current state in the current iteration, for example, according to Eq. (1) or (8).

As an example, as shown in 200b, the first reward for a current state (e.g., the CFV of node 5, $v(I^5)$) can be calculated based on the first reward of action $a_6$(e.g., the CFV of action $a_6$, $v(a_6|I^5)$), the first reward of action $a_7$(e.g., the CFV of the action $a_7$, $v(a_7|I^5)$ and the action selection policy of the current state in the current iteration $\sigma^t(a|I^5)$ such as the probabilities of selecting the actions in the current iteration, for example, according to $v^t(I^5)=\Sigma_a v^t(a|I^5) \sigma^t(a|I^5)=v(a_6|I^5) \sigma^t(a_6|I^5)+v(a_7|I^5) \sigma^t(a_7|I^5)$.

At 310, a respective regret value for each action of the plurality of possible actions is computed based on a difference between the respective first reward for the action and the first reward for the current state. In some embodiments, the regret value of the action in the state of the execution device represents a difference between a gain or utility of the execution device after taking the action in the state and a gain or utility of the execution device in the state (without taking the action). In some embodiments, the respective regret value can be referred to as an iterative regret value in the current iteration.

In some embodiments, an accumulative respective regret value of each action of the plurality of possible actions in the current state in the current iteration is computed based on an accumulative respective regret value of each action in the current state in a previous iteration and the respective iterative regret value of each action in the current state in the current iteration, for example, according to Eq. (4).

As an example, as shown in 200b, an iterative regret value of action $a_6$ in the state of the node 5 in the (t)-th iteration can be calculated according to $r^t(a_6|I^5)=v^t(a_6|I^5)-v^t(I^5)$. An accumulative regret of action $a_6$ in the state of the node 5 after t iterations can be computed according to Eq. (4), such as, $$R^t(a_6 | I^5) = \sum_{t_i=1}^{t} (v^{t_i}(a_6 | I^5) - v^{t_i}(I^5)) = R^{t-1}(a_6 | I^5) + r^t(a_6 | I^5).$$

Similarly, an iterative regret value of action $a_7$ in the state of the node 5 can be calculated according to $r^t(a_7|I^5)=v^t(a_6|I^5)-v^t(I^5)$. An accumulative regret of action $a_7$ in the state of the node 5 after t iterations can be computed according to Eq. (4), such as, $$R^t(a_7 | I^5) = \sum_{t_i=1}^{t} (v^{t_i}(a_7 | I^5) - v^{t_i}(I^5)) = R^{t-1}(a_7 | I^5) + r^t(a_7 | I^5).$$

At 312, an action selection policy of the current state in a next iteration (e.g., $\sigma_i^{t+1}$) is computed based on the respective accumulative regret value of the each action in the current state in the current iteration. The action selection policy of the current state in the next iteration can be used to traverse the game tree in the next iteration. In some embodiments, the iterative action selection policy of the current state in the current iteration is computed based not only on the respective iterative regret value of the each action in the current state in the current iteration but also on iterative regret value of the each action in the current state in iterations prior to the current iteration such as the respective accumulative regret value of the each action in the current state in the previous iteration as shown in Eq. (5).

For example, as described with respect to 200b, the action selection policies of the two actions $a_6$ and $a_7$ at node 5 in the next iteration (e.g., (t+1)-th iteration) can be denoted as $f^{t+1}(a_6|I^5)$ and $f^{t+1}(a_7|I^5)$. The strategies can represent probabilities of each of the two actions $a_6$ and $a_7$ at node 5 that lead to node 6 and node 7, respectively.

At 314, a second reward for the current state is computed based on the respective first rewards for the actions and the action selection policy of the current state in the next iteration. In some embodiments, computing a second reward for the current state based on the respective first rewards for the actions and the action selection policy of the current state in the next iteration comprises computing the second reward for the current state based on a sum of the respective first rewards for actions weighted by corresponding probabilities of selecting the actions in the current state in the next iteration. In some embodiments, the second reward of the state of the execution device can be the FCFV of the state of the execution device. In some embodiments, the second reward of the state of the execution device can be computed according to Eq. (9).

For example, as shown in 200b, the second reward of the current state of the execution device (e.g., the FCFV of node 5, $\check{v}(I^5)$ can be calculated based on a sum of the respective first reward for the each action (e.g., the CFV of action $a_6$, $v(a_6|I^5)$, the CFV of the action $a_7$, $v(a_7|I^5)$) weighted by the respective probability of the each action of the current state in the next iteration (e.g., the strategy $f^{t+1}(a|I^5)$), for example, for example, according to $\check{v}^t(I^5)=\Sigma_a\,v^t(a|I^5)f^{t+1}(a|I^5)=v(a_6|I^5)f^{t+1}(a_6|I^5)+v(a_7|I^5)\,f^{t+1}(a_7|I^5)$.

At 316, the first reward for the previous action in the previous state that leads to the current state is replaced with the second reward for the current state. In some embodiments, the first reward for the previous action in the previous state represents a first reward for the previous action taken by the execution device in the previous state and ca be used for updating the first reward for the previous state based on the second reward of the state. For example, as shown in 200b, the first reward for the previous action in the previous state that leads to the current state (e.g., the CFV of action $a_5$ at the node 1 that leads to node 5, $v(a_5|I^1)$ is updated to be the second reward of the state (e.g., the FCFV of node 5, $\check{v}(I^5)$ to represent a first reward for the previous action taken by the execution device in the previous state (e.g., the CFV of action $a_5$ in the previous state of node 1), for example, for updating the first reward of the previous state (e.g., the CFV of the node 1, $v(I^1)$) based on the second reward of the state (e.g., the FCFV of node 5, $\check{v}(I^5)$), for example, according to Eq, (1) or (8) as described with respect to 200b.

In some embodiments, replacing the first reward for the current state with the second reward for the current state can simply the algorithm and improve the storage efficiency as no additional storage space needs to be allocated to store the second reward of the state.

At 318, whether the current state is the initial state is determined. In some embodiments, such a determination can be used for determining whether to continue or terminate updating the first rewards of the states in the current iteration. In some embodiments, the initial state can be represented by a root node of the game tree (e.g., node 0 as shown in 200b).

If the current state is the initial state, no further updating of the first reward is needed. The process 300 proceeds to 320. If the current state is not the initial state, a previous state of the state (e.g., a parent node of the current node such as node 1 of the current node 5 as shown in 200b) is used to replace the current state, and the process 300 goes back to 306 to obtain a respective first reward for each action (e.g., action $a_4$ and action $a_5$ as shown in 200b) of the previous state (e.g., node 1 as shown in 200b). The process 300 can continue as shown in FIG. 3.

At 320, an action selection policy of the previous state in the next iteration (e.g., the action selection policy of node 1 in the next iteration $\sigma_i^{t+}(a|I_1)$ of $f^{t+1}(a|I_1)$) is determined based on the second reward for the current state (e.g., the FCFV of node 5, $\check{v}(a_5)$). For example, as described with respect to 200b, determining the action selection policy of the previous state in the next iteration based on the second reward of the current state comprises computing a probability (e.g., $f^{t+1}(a_5|I^1)$) of selecting the previous action (e.g., $a_5$) among the plurality of possible actions (e.g., $a_4$ and $a_5$) in the previous state (e.g., the parent node of node 5, that is, node 1 represented by the information set $I^1$) in the next iteration based on the second reward for the current state (e.g., the FCFV of node 5). For example, computing the probability (e.g., $f^{t+1}(a_5|P)$) of selecting the previous action among the plurality of possible actions in the previous state in the next iteration based on the second reward for the current state comprises: computing a first reward for the previous state (e.g., the CFV of node 1, $v(I^1)$) based on the second reward for the current state (e.g., the FCFV of node 5, v ($I^5$), for example, as described with respect to 200b according to $v(I^1)=v(a_4|I^1)\,f^t(a_4|I^1)+v(a_5|I^1)f^t(a_5|I^1)$, wherein the $v(a_5|I^1)$ is the FCFV of node 5, $\check{v}(a_5)$); computing an accumulative regret value of the previous action in the previous state in the current iteration (e.g., $R^t(a_5|I^1)$) based on an accumulative respective regret value of the previous action in the previous state in the previous iteration and a difference between the first reward for the previous action in the previous state (e.g., $R^{t-1}(a_5|I^1)$) and the first reward for the previous state, for example, according to Eq. (4), such as $$R^t(a_5\mid I^1) = \sum_{t_i=1}^{t} (v^{t_i}(a_5\mid I^1) - v^{t_i}(I^1)) = R^{t-1}(a_5\mid I^1) + r^t(a_5\mid I^1);$$

and computing the probability of selecting the previous action among the plurality of possible actions in the previous state in the next iteration based on the accumulative regret value of the previous action in the previous state, for example, according to Eq. (5).

At 322, in response to determining that the convergence condition is met, actions of the execution device are controlled based on the action selection policy. In some embodiments, in response to determining that the convergence condition is met, an average action selection policy across all iterations (e.g., from the first iteration to the current iteration) in each state can be computed. for example, according to Eq. (6). In some embodiments, the average action selection policy can serve as an output of the process 300, for example, as the computed Nash equilibrium. In some embodiments, the average action selection policy across all iterations is computed based on the action selection policy of the previous state in the next iteration; and wherein controlling actions of the execution device based on the action selection policy of the previous state in the next iteration comprises controlling actions of the execution device according to the average action selection policy.

For example, an average action selection policy of the current state of node 5, $\bar{\sigma}^t(a|I_5)$, can be computed based on the action selection policy of the current state $f^{t+1}(a_6|I^5)$ and $f^{t+1}(a_7|I^5)$, for example, according to Eq. (6). The average strategy $\bar{\sigma}^t(a|I_5)$ can be output to approximate Nash equilibrium and to control the action of the execution device in the current state of node 5. Similarly, an average action selection policy of the previous state of node 1, $\bar{\sigma}^t(a|I_1)$, can be computed based on the action selection policy of the previous state $f^{t+1}(a_4|I^1)$ and $f^{t+1}(a_5|I^1)$, for example, according to Eq. (6). The average strategy $\bar{\sigma}^t(a|I_1)$ can be output to approximate Nash equilibrium and to control the action of the execution device in the previous state of node 1.

For example, the action selection policy can serve as an output of the software-implemented application to automatically control the execution device's action at each state, for example, by selecting the action that has the highest probability among a plurality of possible actions based on the action selection policy. As an example, the environment comprises a traffic routing environment, the execution device supported by the application comprises a computer-assisted vehicle, the action selection policy comprises a route selection policy for controlling directions of the computer-assisted vehicle, and controlling operations of the execution device according to the action selection policy comprises controlling directions of the computer-assisted vehicle according to the route selection policy.

Figure 4:
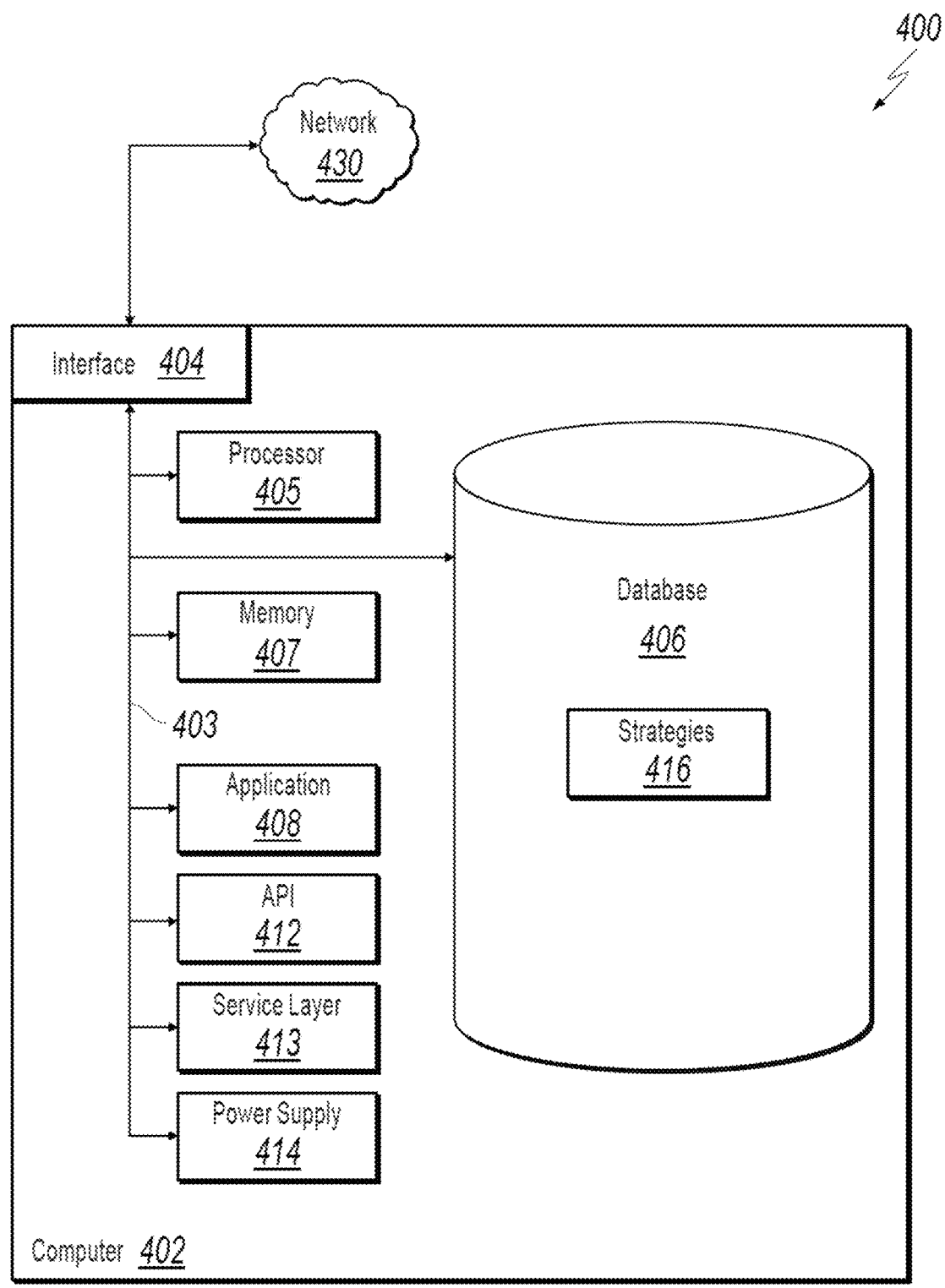
FIG. 4 depicts a block diagram illustrating an example of a computer-implemented system used to provide computational functionalities associated with described algorithms, methods, functions, processes, flows, and procedures, in accordance with embodiments of this specification.

FIG. 4 depicts a block diagram illustrating an example of a computer-implemented system 400 used to provide computational functionalities associated with described algorithms, methods, functions, processes, flows, and procedures in accordance with embodiments of this specification. FIG. 4 is a block diagram illustrating an example of a computer-implemented System 400 used to provide computational functionalities associated with described algorithms, methods, functions, processes, flows, and procedures, according to an embodiment of the present disclosure. In the illustrated embodiment, System 400 includes a Computer 402 and a Network 430.

The illustrated Computer 402 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 402 can include an input device, such as a keypad, keyboard, touch screen, another input device, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as a client, network component, a server, a database or another persistency, another role, or a combination of roles for performing the subject matter described in the present disclosure. The illustrated Computer 402 is communicably coupled with a Network 430. In some embodiments, one or more components of the Computer 402 can be configured to operate within an environment, including cloud-computing-based, local, global, another environment, or a combination of environments.

At a high level, the Computer 402 is an electronic computing device operable to receive, transmit, process, store, or manage data and information associated with the described subject matter. According to some embodiments, the Computer 402 can also include or be communicably coupled with a server, including an application server, e-mail server, web server, caching server, streaming data server, another server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third-parties, or other entities, individuals, systems, or computers.

Each of the components of the Computer 402 can communicate using a System Bus 403. In some embodiments, any or all of the components of the Computer 402, including hardware, software, or a combination of hardware and software, can interface over the System Bus 403 using an application programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 402, alternative embodiments can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular embodiments of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular embodiments of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory, conventional, or another type of database storing data consistent with the present disclosure. In some embodiments, Database 406 can be a combination of two or more different database types (for example, a hybrid in-memory and conventional database) according to particular needs, desires, or particular embodiments of the Computer 402 and the described functionality. Although illustrated as a single Database 406, two or more databases of similar or differing types can be used according to particular needs, desires, or particular embodiments of the Computer 402 and the described functionality. While Database 406 is illustrated as an integral component of the Computer 402, in alternative embodiments, Database 406 can be external to the Computer 402. As an example, Database 406 can include the above-described strategies 416 of a CFR algorithm.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some embodiments, Memory 407 can be a combination of two or more different types of memory (for example, a combination of semiconductor and magnetic storage) according to particular needs, desires, or particular embodiments of the Computer 402 and the described functionality. Although illustrated as a single Memory 407, two or more Memories 407 or similar or differing types can be used according to particular needs, desires, or particular embodiments of the Computer 402 and the described functionality. While Memory 407 is illustrated as an integral component of the Computer 402, in alternative embodiments, Memory 407 can be external to the Computer 402.

The Application 408 is an algorithmic software engine providing functionality according to particular needs, desires, or particular embodiments of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative embodiments, the Application 408 can be external to the Computer 402.

The Computer 402 can also include a Power Supply 414. The Power Supply 414 can include a rechargeable or non-rechargeable battery that can be configured to be either user- or non-user-replaceable. In some embodiments, the Power Supply 414 can include power-conversion or management circuits (including recharging, standby, or another power management functionality). In some embodiments, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Figure 5:
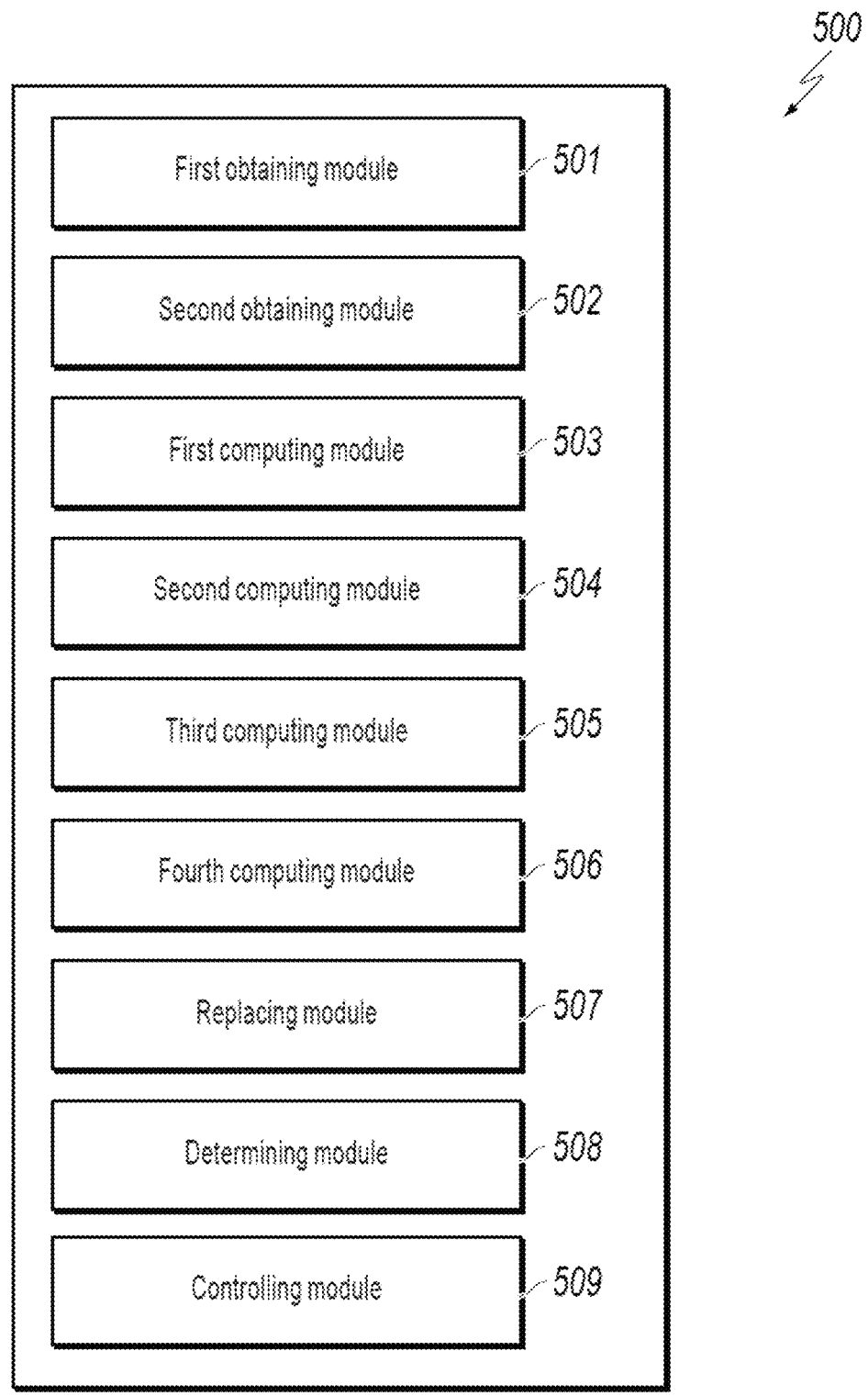
FIG. 5 is a diagram of an example of modules of an apparatus, in accordance with embodiments of this specification.

FIG. 5 is a diagram of an example of modules of an apparatus 500 in accordance with embodiments of this specification. In some embodiments, the apparatus 500 can perform a computer-implemented method for an execution device for generating an action selection policy for completing a task in an environment that includes the execution device and one or more other devices. In some embodiments, the method represents the environment, possible actions of parties, and imperfect information available to the application about the other parties with data representing an imperfect information game (IIG), wherein the application determines the actionable output by performing a counterfactual regret minimization (CFR) for strategy searching in strategic interaction between the parties in an iterative manner, for example, by performing two or more iterations.

The apparatus 500 can correspond to the embodiments described above, and the apparatus 500 includes the following: a first obtaining module 501 for obtaining, in a current iteration of a plurality of iterations, an action selection policy of a current state in the current iteration, wherein the action selection policy specifies a respective probability of selecting an action among a plurality of possible actions in the current state, wherein the current state results from a previous action taken by the execution device in a previous state, and each action of the plurality of possible actions leads to a respective next state if performed by the execution device when the execution device is in the current state; a second obtaining module 502 for obtaining a respective first reward for each action in the current state, wherein the respective first reward for each action represents a gain attributed to the action towards completing the task; a first computing module 503 for computing a first reward for the current state based on the respective first rewards for the actions and the action selection policy of the current state in the current iteration, wherein the first reward for the current state represents a gain attributed to the current state towards completing the task; a second computing module 504 for computing an accumulative respective regret value of each action of the plurality of possible actions in the current state in the current iteration based on an accumulative respective regret value of each action in a previous iteration and a difference between the respective first reward for the action and the first reward for the current state; a third computing module 505 for computing an action selection policy of the current state in the next iteration based on the respective accumulative regret value of the each action in the current state in the current iteration; a fourth computing module 506 for computing a second reward for the current state based on the respective first rewards for the actions and the action selection policy of the current state in the next iteration; a determining module 508 for determining an action selection policy of the previous state in the next iteration based on the second reward for the current state; and a controlling module 509 for controlling actions of the execution device based on the action selection policy of the previous state in the next iteration in response to determining that a convergence condition is met.

In an optional embodiment, wherein obtaining a respective first reward of the each action in the current state comprises obtaining a respective first reward of the each action in the current state by traversing a game tree that represents the environment based on an action selection policy of the current state in a previous iteration.

In an optional embodiment, wherein computing a first reward of the current state based on the respective first rewards for the actions and the action selection policy of the current state in the current iteration comprises computing the first reward for the current state based on a sum of the respective first rewards for actions weighted by corresponding probabilities of selecting the actions in the current state in the current iteration.

In an optional embodiment, wherein computing a second reward for the current state based on the respective first rewards for the actions and the action selection policy of the current state in the next iteration comprises computing the second reward for the current state based on a sum of the respective first rewards for actions weighted by corresponding probabilities of selecting the actions in the current state in the next iteration.

In an optional embodiment, the apparatus 500 further comprising a replacing module 507 for replacing the first reward for the previous action in the previous state that leads to the current state with the second reward for the current state.

In an optional embodiment, wherein determining the action selection policy of the previous state in the next iteration based on the second reward for the current state comprises computing a probability of selecting the previous action among the plurality of possible actions in the previous state in the next iteration based on the second reward for the current state.

In an optional embodiment, further comprising: in response to determining that a convergence condition is met, computing an average action selection policy across all iterations based on the action selection policy of the previous state in the next iteration; and wherein controlling actions of the execution device based on the action selection policy of the previous state in the next iteration comprises controlling actions of the execution device according to the average action selection policy.

In an optional embodiment, wherein: the environment comprises a traffic routing environment, the execution device supported by the application comprises a computer-assisted vehicle, the action selection policy comprises a route selection policy for controlling directions of the computer-assisted vehicle, and controlling operations of the execution device according to the action selection policy comprises controlling directions of the computer-assisted vehicle according to the route selection policy.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 5, it can be interpreted as illustrating an internal functional module and a structure of a data processing apparatus for generating an action selection policy for a software-implemented application that performs actions in an environment that includes an execution party supported by the application and one or more other parties. An execution body in essence can be an electronic device, and the electronic device includes the following: one or more processors and a memory configured to store an executable instruction of the one or more processors.

The techniques described in this specification produce one or more technical effects. In some embodiments, the described techniques can be performed by an execution device for generating an action selection policy for completing a task in an environment that includes the execution device and one or more other devices. In some embodiments, the described techniques can determine an action selection policy for a software-implemented application that performs actions in an environment that includes an execution party supported by the application and one or more other parties. In some embodiments, the described techniques can be used in automatic control, robotics, or any other applications that involve action selections.

In some embodiments, the described techniques can help find better strategies of real-world scenarios such as resource allocation, product/service recommendation, cyber-attack prediction and/or prevention, traffic routing, fraud management, etc. that can be modeled or represented by strategic interaction between parties, such as, an IIG that involves two or more parties in a more efficient manner.

In some embodiments, the described techniques can improve the convergence speed of a counterfactual regret minimization (CFR) algorithm in finding Nash equilibrium for solving a game that represents one or more real-world scenarios. In some embodiments, the described techniques can improve computational efficiency and reduce the computational load of the CFR algorithm in finding the best strategies of the real-world scenarios modeled by the IIG, for example, by using an incremental strategy, rather than an accumulative regret or average strategy, in updating the strategy and regret values for each iteration of the CFR algorithm.

In some embodiments, the disclosed fast asynchronous CFR algorithm can provide faster convergence compared to the original CFR algorithm. For example, the fast asynchronous CFR algorithm can use FCFVs to take advantage of an updated incremental strategy computed based on CFVs in a current iteration without waiting until the next iteration. As such, the fast asynchronous CFR algorithm can achieve a convergence faster than the original CFR algorithm.

Described embodiments of the subject matter can include one or more features, alone or in combination. For example, in a first embodiment, a computer-implemented method of an execution device for generating an action selection policy for completing a task in an environment that includes the execution device and one or more other devices, the method comprising, in a current iteration of a plurality of iterations, obtaining an action selection policy of a current state in the current iteration, wherein the action selection policy specifies a respective probability of selecting an action among a plurality of possible actions in the current state, wherein the current state results from a previous action taken by the execution device in a previous state, and each action of the plurality of possible actions leads to a respective next state if performed by the execution device when the execution device is in the current state; obtaining a respective first reward for each action in the current state, wherein the respective first reward for each action represents a gain attributed to the action towards completing the task; computing a first reward for the current state based on the respective first rewards for the actions and the action selection policy of the current state in the current iteration, wherein the first reward for the current state represents a gain attributed to the current state towards completing the task; computing an accumulative respective regret value of each action of the plurality of possible actions in the current state in the current iteration based on an accumulative respective regret value of each action in a previous iteration and a difference between the respective first reward for the action and the first reward for the current state; computing an action selection policy of the current state in the next iteration based on the respective accumulative regret value of the each action in the current state in the current iteration; computing a second reward for the current state based on the respective first rewards for the actions and the action selection policy of the current state in the next iteration; and determining an action selection policy of the previous state in the next iteration based on the second reward for the current state; and in response to determining that a convergence condition is met, controlling actions of the execution device based on the action selection policy of the previous state in the next iteration.

The foregoing and other described embodiments can each, optionally, include one or more of the following features:

A first feature, combinable with any of the following features, wherein obtaining a respective first reward of the each action in the current state comprises obtaining a respective first reward of the each action in the current state by traversing a game tree that represents the environment based on an action selection policy of the current state in a previous iteration.

A second feature, combinable with any of the following features, wherein computing a first reward of the current state based on the respective first rewards for the actions and the action selection policy of the current state in the current iteration comprises computing the first reward for the current state based on a sum of the respective first rewards for actions weighted by corresponding probabilities of selecting the actions in the current state in the current iteration.

A third feature, combinable with any of the following features, wherein computing a second reward for the current state based on the respective first rewards for the actions and the action selection policy of the current state in the next iteration comprises computing the second reward for the current state based on a sum of the respective first rewards for actions weighted by corresponding probabilities of selecting the actions in the current state in the next iteration.

A fourth feature, combinable with any of the following features, further comprising replacing the first reward for the previous action in the previous state that leads to the current state with the second reward for the current state.

A fifth feature, combinable with any of the following features, wherein determining the action selection policy of the previous state in the next iteration based on the second reward for the current state comprises computing a probability of selecting the previous action among the plurality of possible actions in the previous state in the next iteration based on the second reward for the current state.

A sixth feature, combinable with any of the following features, further comprising: in response to determining that a convergence condition is met, computing an average action selection policy across all iterations based on the action selection policy of the previous state in the next iteration; and wherein controlling actions of the execution device based on the action selection policy of the previous state in the next iteration comprises controlling actions of the execution device according to the average action selection policy.

A seventh feature, combinable with any of the following features, wherein: the environment comprises a traffic routing environment, the execution device supported by the application comprises a computer-assisted vehicle, the action selection policy comprises a route selection policy for controlling directions of the computer-assisted vehicle, and controlling operations of the execution device according to the action selection policy comprises controlling directions of the computer-assisted vehicle according to the route selection policy.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for generating an action selection policy for causing an execution device to complete a task in an environment that includes the execution device and one or more other devices, the method comprising:
   in a current iteration of a plurality of iterations,
      obtaining, by a computer system, an action selection policy of a current state in the current iteration, wherein the action selection policy specifies a respective probability of selecting an action among a plurality of possible actions in the current state, wherein the current state results from a previous action taken by the execution device in a previous state, and each action of the plurality of possible actions leads to a respective next state if performed by the execution device when the execution device is in the current state;
      obtaining, by the computer system, a respective first reward for each action in the current state, wherein the respective first reward for each action represents a gain attributed to the action towards completing the task;
      computing, by the computer system, a first reward for the current state based on the respective first rewards for the actions and the action selection policy of the current state in the current iteration, wherein the first reward for the current state represents a gain attributed to the current state towards completing the task;
      computing, by the computer system, an accumulative respective regret value of each action of the plurality of possible actions in the current state in the current iteration based on an accumulative respective regret value of each action in a previous iteration and a difference between the respective first reward for the action and the first reward for the current state;
      computing, by the computer system, an action selection policy of the current state in the next iteration based on the respective accumulative regret value of the each action in the current state in the current iteration;
      computing, by the computer system, a second reward for the current state based on the respective first rewards for the actions and the action selection policy of the current state in the next iteration; and
      determining, by the computer system, an action selection policy of the previous state in the next iteration based on the second reward for the current state; and
   in response to determining that a convergence condition is met, controlling, by the computer system, actions of the execution device based on the action selection policy of the previous state in the next iteration.

2. The method of claim 1, wherein obtaining a respective first reward of the each action in the current state comprises obtaining a respective first reward of the each action in the current state by traversing a game tree that represents the environment based on an action selection policy of the current state in a previous iteration.

3. The method of claim 1, wherein computing a first reward of the current state based on the respective first rewards for the actions and the action selection policy of the current state in the current iteration comprises computing the first reward for the current state based on a sum of the respective first rewards for actions weighted by corresponding probabilities of selecting the actions in the current state in the current iteration.

4. The method of claim 1, wherein computing a second reward for the current state based on the respective first rewards for the actions and the action selection policy of the current state in the next iteration comprises computing the second reward for the current state based on a sum of the respective first rewards for actions weighted by corresponding probabilities of selecting the actions in the current state in the next iteration.

5. The method of claim 1, further comprising replacing the first reward for the previous action in the previous state that leads to the current state with the second reward for the current state.

6. The method of claim 1, wherein determining the action selection policy of the previous state in the next iteration based on the second reward for the current state comprises computing a probability of selecting the previous action among the plurality of possible actions in the previous state in the next iteration based on the second reward for the current state.

7. The method of claim 1, further comprising:
   in response to determining that a convergence condition is met, computing an average action selection policy across all iterations based on the action selection policy of the previous state in the next iteration; and
   wherein controlling actions of the execution device based on the action selection policy of the previous state in the next iteration comprises controlling actions of the execution device according to the average action selection policy.

8. The method of claim 1, wherein:
   the environment comprises a traffic routing environment,
   the execution device comprises a computer-assisted vehicle,
   the action selection policy comprises a route selection policy for controlling directions of the computer-assisted vehicle, and
   controlling operations of the execution device according to the action selection policy comprises controlling directions of the computer-assisted vehicle according to the route selection policy.

9. A system for performing a software-implemented application for generating an action selection policy for completing a task in an environment that includes an execution device and one or more other devices, the system comprising:

one or more processors; and
one or more computer-readable memories coupled to the one or more processors and having instructions stored thereon that are executable by the one or more processors to perform operations comprising:
in a current iteration of a plurality of iterations,
obtaining an action selection policy of a current state in the current iteration, wherein the action selection policy specifies a respective probability of selecting an action among a plurality of possible actions in the current state, wherein the current state results from a previous action taken by the execution device in a previous state, and each action of the plurality of possible actions leads to a respective next state if performed by the execution device when the execution device is in the current state;
obtaining a respective first reward for each action in the current state, wherein the respective first reward for each action represents a gain attributed to the action towards completing the task;
computing a first reward for the current state based on the respective first rewards for the actions and the action selection policy of the current state in the current iteration, wherein the first reward for the current state represents a gain attributed to the current state towards completing the task;
computing an accumulative respective regret value of each action of the plurality of possible actions in the current state in the current iteration based on an accumulative respective regret value of each action in a previous iteration and a difference between the respective first reward for the action and the first reward for the current state;
computing an action selection policy of the current state in the next iteration based on the respective accumulative regret value of the each action in the current state in the current iteration;
computing a second reward for the current state based on the respective first rewards for the actions and the action selection policy of the current state in the next iteration; and
determining an action selection policy of the previous state in the next iteration based on the second reward for the current state; and
in response to determining that a convergence condition is met, controlling actions of the execution device based on the action selection policy of the previous state in the next iteration.

10. The system of claim 9, wherein obtaining a respective first reward of the each action in the current state comprises obtaining a respective first reward of the each action in the current state by traversing a game tree that represents the environment based on an action selection policy of the current state in a previous iteration.

11. The system of claim 9, wherein computing a first reward of the current state based on the respective first rewards for the actions and the action selection policy of the current state in the current iteration comprises computing the first reward for the current state based on a sum of the respective first rewards for actions weighted by corresponding probabilities of selecting the actions in the current state in the current iteration.

12. The system of claim 9, wherein computing a second reward for the current state based on the respective first rewards for the actions and the action selection policy of the current state in the next iteration comprises computing the second reward for the current state based on a sum of the respective first rewards for actions weighted by corresponding probabilities of selecting the actions in the current state in the next iteration.

13. The system of claim 9, the operations further comprising replacing the first reward for the previous action in the previous state that leads to the current state with the second reward for the current state.

14. The system of claim 9, wherein determining the action selection policy of the previous state in the next iteration based on the second reward for the current state comprises computing a probability of selecting the previous action among the plurality of possible actions in the previous state in the next iteration based on the second reward for the current state.

15. The system of claim 9, the operations further comprising:
in response to determining that a convergence condition is met, computing an average action selection policy across all iterations based on the action selection policy of the previous state in the next iteration; and
wherein controlling actions of the execution device based on the action selection policy of the previous state in the next iteration comprises controlling actions of the execution device according to the average action selection policy.

16. The system of claim 9, wherein:
the environment comprises a traffic routing environment,
the execution device comprises a computer-assisted vehicle,
the action selection policy comprises a route selection policy for controlling directions of the computer-assisted vehicle, and
controlling operations of the execution device according to the action selection policy comprises controlling directions of the computer-assisted vehicle according to the route selection policy.

17. A non-transitory, computer-readable storage medium storing one or more instructions executable by a computer system to perform operations for generating an action selection policy for completing a task in an environment that includes an execution device and one or more other devices, the operations comprising:
in a current iteration of a plurality of iterations,
obtaining, by the computer system, an action selection policy of a current state in the current iteration, wherein the action selection policy specifies a respective probability of selecting an action among a plurality of possible actions in the current state, wherein the current state results from a previous action taken by the execution device in a previous state, and each action of the plurality of possible actions leads to a respective next state if performed by the execution device when the execution device is in the current state;
obtaining, by the computer system, a respective first reward for each action in the current state, wherein the respective first reward for each action represents a gain attributed to the action towards completing the task;
computing, by the computer system, a first reward for the current state based on the respective first rewards for the actions and the action selection policy of the current state in the current iteration, wherein the first reward for the current state represents a gain attributed to the current state towards completing the task;
computing, by the computer system, an accumulative respective regret value of each action of the plurality of possible actions in the current state in the current iteration based on an accumulative respective regret value of each action in a previous iteration and a difference between the respective first reward for the action and the first reward for the current state;

computing, by the computer system, an action selection policy of the current state in the next iteration based on the respective accumulative regret value of the each action in the current state in the current iteration;

computing, by the computer system, a second reward for the current state based on the respective first rewards for the actions and the action selection policy of the current state in the next iteration; and determining, by the computer system, an action selection policy of the previous state in the next iteration based on the second reward for the current state; and in response to determining that a convergence condition is met, controlling, by the computer system, actions of the execution device based on the action selection policy of the previous state in the next iteration.

18. The non-transitory, computer-readable storage medium of claim 17, wherein obtaining a respective first reward of the each action in the current state comprises obtaining a respective first reward of the each action in the current state by traversing a game tree that represents the environment based on an action selection policy of the current state in a previous iteration.

19. The non-transitory, computer-readable storage medium of claim 17, wherein computing a first reward of the current state based on the respective first rewards for the actions and the action selection policy of the current state in the current iteration comprises computing the first reward for the current state based on a sum of the respective first rewards for actions weighted by corresponding probabilities of selecting the actions in the current state in the current iteration.

20. The non-transitory, computer-readable storage medium of claim 17, wherein computing a second reward for the current state based on the respective first rewards for the actions and the action selection policy of the current state in the next iteration comprises computing the second reward for the current state based on a sum of the respective first rewards for actions weighted by corresponding probabilities of selecting the actions in the current state in the next iteration.

21. The non-transitory, computer-readable storage medium of claim 17, the operations further comprising replacing the first reward for the previous action in the previous state that leads to the current state with the second reward for the current state.

22. The non-transitory, computer-readable storage medium of claim 17, wherein determining the action selection policy of the previous state in the next iteration based on the second reward for the current state comprises computing a probability of selecting the previous action among the plurality of possible actions in the previous state in the next iteration based on the second reward for the current state.

23. The non-transitory, computer-readable storage medium of claim 17, the operations further comprising:
in response to determining that a convergence condition is met, computing an average action selection policy across all iterations based on the action selection policy of the previous state in the next iteration; and
wherein controlling actions of the execution device based on the action selection policy of the previous state in the next iteration comprises controlling actions of the execution device according to the average action selection policy.

24. The non-transitory, computer-readable storage medium of claim 17, wherein:
the environment comprises a traffic routing environment,
the execution device comprises a computer-assisted vehicle,
the action selection policy comprises a route selection policy for controlling directions of the computer-assisted vehicle, and
controlling operations of the execution device according to the action selection policy comprises controlling directions of the computer-assisted vehicle according to the route selection policy.

* * * * *